United States Patent

[11] 3,563,315

[72] Inventors Edwin E. Claytor, Jr.;
 David W. Simms, Tulsa, Okla.
[21] Appl. No. 840,055
[22] Filed July 8, 1969
[45] Patented Feb. 16, 1971
[73] Assignee Pan American Petroleum Corporation
 Tulsa, Okla.
 a corporation of Delaware

[54] WELL CLEANING METHOD
 4 Claims, No Drawings
[52] U.S. Cl. ................................................. 166/304,
 166/312
[51] Int. Cl. ...................................................... E21b 21/00,
 E21b 43/28
[50] Field of Search ........................................... 166/304,
 310, 311, 312; 252/8.55 (EB), 8.3, 364, 387

[56] References Cited
UNITED STATES PATENTS

| | | | |
|---|---|---|---|
| 1,844,883 | 2/1932 | De Groote | 252/8.3 |
| 2,756,211 | 7/1956 | Jones | 252/8.55(E) |
| 2,914,475 | 11/1959 | Oxford | 252/8.55(E) |
| 2,941,943 | 6/1960 | Kirkpatrick et al. | 252/8.55(E) |
| 3,070,162 | 12/1962 | Barnard | 166/312X |
| 3,241,614 | 3/1966 | Bertness | 166/304 |
| 3,244,188 | 4/1966 | Parks et al. | 166/304X |
| 3,437,146 | 4/1969 | Everhart et al. | 166/303 |

FOREIGN PATENTS

| | | | |
|---|---|---|---|
| 839,112 | 6/1960 | Great Britain | 252/8.3 |

*Primary Examiner*—Stephen J. Novosad
*Attorneys*—Paul F. Hawley and Buell B. Hamilton

ABSTRACT: Removal of corrosion-inhibiting film from metal surfaces by solvents containing carbon disulfide is prevented by including a small amount of the inhibitor in the solvent.

WELL CLEANING METHOD

Some solvents used in oil wells, such as paraffin solvents, contain carbon disulfide. Carbon disulfide is often the only practical solvent for sulfur which is deposited in wells producing gases with high concentrations of sulfur and hydrogen sulfide. In almost all these wells, corrosion is a problem. The corrosion is controlled by contacting the exposed metal surfaces with a salt of a high molecular-weight amine and a high molecular-weight carboxylic acid. The salt forms a corrosion-inhibiting film on the metal surfaces.

It has been found that carbon disulfide, when used alone, or even when present in low concentrations in a multicomponent solvent, strips the inhibiting film of amine salt off of metal surfaces leaving them subject to corrosion. The carbon disulfide not only removes the film, but appears to accelerate pitting of metal surfaces. A new film can be laid down after each solvent treatment, but the formation of such a film usually requires a relatively expensive treatment with a high concentration of inhibitor. Maintaining the film in good repair then requires only infrequent treatments with small volumes of inhibitor solutions containing low concentrations of inhibitor. Therefore, some way is needed for preventing removal of the inhibitor film from the metal surface by the carbon disulfide.

An object of this invention is to provide a composition for treating a well in which carbon disulfide is an ingredient of the composition, but in which an additive is included which keeps the carbon disulfide from stripping inhibitor films from the metal surfaces. Another object is to provide a method for preventing carbon disulfide from removing corrosion-inhibiting films from metal surfaces. A more specific object is to provide a composition and method for removing deposits of paraffin, sulfur, and the like, from wells and formations penetrated by wells without removing amine salt corrosion-inhibiting films from metal surfaces in the well. Still other objects will be apparent from the following description and claims.

In general, we accomplish the objects of our invention by dissolving a low concentration of amine salt corrosion inhibitor in the solvent, which contains carbon disulfide. Although the concentration of amine salt is far below that necessary to saturate the solvent with amine salt, it prevents removal of the salt film from surfaces by the carbon disulfide.

The ability of carbon disulfide to strip amine salt films from metal surfaces was tested by preforming an amine salt film on metal coupons, dipping the coupons in carbon disulfide, and then measuring the rate of corrosion of the coupons by brine containing hydrogen sulfide. The amine salt was an approximately neutral salt of petroleum-derived naphthenic acids with amines having the general formula $$RNH(CH_2)_3NH_2,$$

in which R is a mixture of hydrocarbon radicals present in glycerine esters from tallow. A solution was prepared containing about 1,000 parts per million of the salt in kerosene. The film was formed on the metal coupon by dipping the coupons in this solution for 10 seconds.

Corrosion was tested by lowering the coupon through 100 milliliters of kerosene into 900 milliliters of brine in a 1,000 milliliter Florence flask, the brine containing 5 percent sodium chloride and about 500 parts per million hydrogen sulfide. The coupon was left suspended in the brine for 7 days. Results are presented in Table I.

TABLE I

| Immersion time in CS₂ | Coupon weight loss, grams | | Percent Inhibition |
|---|---|---|---|
| | Inhibited | Control [1] | |
| 0 seconds | 0.0021 | 0.0404 | 94.8 |
| 10 seconds | 0.0372 | 0.0374 | 0.5 |
| 10 minutes | 0.0340 | 0.0352 | 3.4 |
| 30 minutes | 0.0321 | 0.0362 | 11.3 |
| 1 hour | 0.0338 | 0.0368 | 8.1 |
| 2 hours | 0.0342 | 0.0364 | 6.0 |
| 4 hours | 0.0327 | 0.0358 | 8.6 |

[1] Not filmed with inhibitor, but dipped in CS₂ for same time as inhibited coupons. The control coupon not dipped in CS₂ (0 seconds) was dipped in kerosene.

The data in Table I show that exposure of an amine salt film to carbon disulfide for only 10 seconds removes the film almost completely.

The test was repeated using various concentrations of the amine salt corrosion inhibitor in the carbon disulfide. Still other tests determined the concentration of amine salt necessary to prevent stripping of inhibitor films by mixtures of carbon disulfide with various amounts of kerosene. Most of the tests were made by dipping the inhibitor-treated coupon in the solvent for 10 seconds. A few were made in which the exposure to carbon disulfide was 10 minutes. Results are presented in Table II.

TABLE II

| Test No. | Solvent, percent | | Inhibitor conc., wt. percent | Exposure time, sec. | Percent inhibition |
|---|---|---|---|---|---|
| | CS₂ | Kerosene | | | |
| 1 | 100 | 0 | 5.0 | 10 | 86.4 |
| 2 | 100 | 0 | 2.5 | 10 | 87.7 |
| 3 | 100 | 0 | 1.25 | 10 | 63.8 |
| 4 | 100 | 0 | 0.25 | 10 | 22.4 |
| 5 | 100 | 0 | 0.125 | 10 | 15.2 |
| 6 | 100 | 0 | 0.025 | 10 | 11.2 |
| 7 | 50 | 50 | 5.0 | 10 | 85.6 |
| 8 | 50 | 50 | 2.5 | 10 | 88.9 |
| 9 | 50 | 50 | 1.25 | 10 | 43.9 |
| 10 | 50 | 50 | 0.25 | 10 | 11.2 |
| 11 | 50 | 50 | 0.125 | 10 | 32.9 |
| 12 | 50 | 50 | 0.025 | 10 | 0.5 |
| 13 | 10 | 90 | 1.25 | 10 | 62.2 |
| 14 | 10 | 90 | 0.25 | 10 | 17.0 |
| 15 | 10 | 90 | 0.125 | 10 | 15.5 |
| 16 | 10 | 90 | 0.025 | 10 | 13.2 |
| 17 | 50 | 50 | 1.25 | 600 | 85.5 |
| 18 | 50 | 50 | 0.25 | 600 | 36.7 |

Test 4, 10, 14, and 18 indicate that a concentration of less than about 1 percent by weight of inhibitor in a solvent containing carbon disulfide is not sufficient to prevent stripping of inhibitor films from metal surfaces. Tests 3, 9, 13, and 17 indicate that as little as about 1.25 percent by weight is sufficient to prevent much of the stripping action. Thus, the concentration of amine salt should be at least about 1 percent by weight and preferably at least about 2 percent in the solvent containing carbon disulfide. A maximum amine salt concentration of about 4 percent by weight is preferred. This is partly for economic reasons since higher concentrations provide little, if any, better results. In addition, a 5 percent solution in carbon disulfide is cloudy indicating the solubility limit in carbon disulfide is somewhere around 4 percent. Thus, if carbon disulfide is the only solvent, as in sulfur solvents and some paraffin solvents, the composition will consist essentially of about 96 to 99 percent by weight of carbon disulfide and about 1 to 4 present, and preferably about 2 to 4 percent, by weight of the amine salt.

If other solvents, such as kerosene are present, however, as in most paraffin solvents, the solubility limit of the amine salt can be more than 50 percent. For example, the solvent may contain only 5 or 10 percent carbon disulfide, the remaining solvent being made up of liquid hydrocarbons, such as gasoline, kerosene, benzene, xylene, or the like. Paraffin solvents may contain, for example, from about 5 to about 99 percent carbon disulfide, from 0 to 94 percent of liquid hydrocarbons, and at least 1 percent, and preferably from about 2 to 4 percent, of the amine salt.

Some peculiarities will be noted in the data in Table II. It might be assumed that, in order to keep the carbon disulfide from stripping inhibitor films from metal surfaces, the carbon disulfide would have to be saturated with the inhibitor. The solubility of amine salt inhibitors in pure carbon disulfide is limited, as noted above. The 2.5 percent concentration produced a clear solution, however, while as little as 1.25 percent had some effects in preventing stripping of the amine salt film. It seems clear, then, that the action is not due simply to saturating the carbon disulfide with the inhibitor.

This is seen even more clearly in Tests 7 to 12. The amine salt is highly soluble in the kerosene-carbon disulfide solution, but the same low concentrations are still effective. The amine salt is even more soluble in the solvent containing 90 percent kerosene and 10 percent carbon disulfide. In spite of this increased solubility and the lower carbon disulfide concentration, the same concentration limits apply. The independence of the minimum inhibitor concentration and the carbon disulfide content of the solvent is not understood. This independence is very apparent from the data in Table II, however.

The other peculiarity can be seen by comparing Test 9 to Test 17, and Test 10 to Test 18. The solvent was the same in all cases. Why a better inhibiting film is present after 10 minutes' exposure to the solvent than after 10 seconds' exposure is not understood. It is true that the concentration of amine salt in the solvent was higher than the concentration of amine salt in the kerosene solution from which the film was originally deposited. Therefore, it might be supposed that a possible explanation was that upon long exposure to the solvent containing the higher concentration of inhibitor, a somewhat better film might be formed. This is probably not true, however, since the first test in Table I shows the kerosene solution deposited a much better film that the film which remained after exposure to the solvent solution in either Test 17 or 18. In addition, Tests 9 and 10 show the tendency of the solvent is to remove films, even in the short time of 10 seconds. Possibly, removal and deposition take place simultaneously, the film deposited from carbon disulfide solution being somewhat more resistant to the effects of carbon disulfide than a film deposited from hydrocarbon solution. Again, the action simple is not well understood. The important point is that inhibitor films remain even after long exposure to solvents containing carbon disulfide if at least about 1 percent of an appropriate amine salt is present.

Preferably, the amine salt inhibitor should be one such as those described in U.S. Pat. Nos. 2,599,385 Gross et al., 2,736,958 Pfohl et al., 2,756,211 Jones, 2,914,577 Oxford, or the like. Still others are suitable and are in common use. Preferably, also, the amine salt dissolved in the solvent containing the carbon disulfide should be the same salt ordinary used to deposit the film on the metal surfaces to be contacted by the solvent. Since mixed salts are effective, however, the amine salt used in the solvent can be different than the one in the film. In general, the amine should contain at least about 10, and preferably from about 12 to about 20, carbon atoms per molecule. The acid should contain at least about 6 and preferably between about 10 and about 20 carbon atoms per molecule.

Before the sulfur or paraffin removal treatment, corrosion is inhibited by contacting exposed metal surfaces in the well by a corrosion-inhibiting amine salt. This can be done by any of the many ways commonly used in the prior art. For example, the amine salt may be periodically or continuously introduced in a solvent, such as kerosene, or dispersed in water. This establishes the amine salt film which inhibits corrosion. After the removal of sulfur, paraffin, and the like, with the solvent containing carbon disulfide and the amine salt, regular corrosion-inhibiting treatment to contact the metal surfaces with the amine salts is resumed to maintain the film in good repair.

Since the low concentration of amine salt is effective in solvents containing a wide range of concentrations of carbon disulfide, our compositions and preparations have many applications. Use for removing sulfur and paraffin has been mentioned. Still other applications and modifications will be apparent to those skilled in the art, so we do not wish to be limited to the examples given above, but only by the following claims.

We claim:

1. A method for treating a well in which corrosion of metal surfaces exposed to said well takes place and in which sulfur deposition occurs in at least one of the well and the formation penetrated by said well, the method comprising:

contacting said exposed metal surfaces with a corrosion-inhibiting amine salt of a carboxylic acid whereby a corrosion-inhibiting film of the amine salt is deposited on the metal surfaces;

when a troublesome amount of sulfur has deposited, contacting said sulfur with carbon disulfide containing at least about 1 percent by weight of an amine salt of a carboxylic acid, said amine having at least about 10 carbon atoms per molecule and said acid having at least about 6 carbon atoms per molecule, whereby said sulfur is removed by said carbon disulfide without removal of said amine salt film from said metal surfaces; and then resuming contacting of exposed metal surfaces with said corrosion-inhibiting amine salt.

2. The method of claim 1 in which said amine has from about 12 to about 20 carbon atoms per molecule and said acid has from about 10 to about 20 carbon atoms per molecule and the concentration of said amine salt is between about 2 and about 4 percent by weight.

3. A method for treating a well in which corrosion of metal surfaces exposed to said well takes place and in which paraffin deposition occurs in at least one of the well and the formation penetrated by said well, the method comprising:

contacting said exposed metal surfaces with a corrosion-inhibiting amine salt of a carboxylic acid whereby a corrosion-inhibiting film of the amine salt is deposited on the metal surfaces;

when a troublesome amount of paraffin has deposited, contacting said paraffin with a paraffin solvent containing carbon disulfide and at least about 1 percent by weight of an amine salt of a carboxylic acid, said amine having at least about 10 carbon atoms per molecule and said acid having at least about 6 carbon atoms per molecule, whereby said paraffin is removed by said solvent without removal of said amine salt film by said carbon disulfide; and then resuming contacting of exposed metal surfaces with said corrosion-inhibiting amine salt.

4. The method of claim 3 in which said amine has from about 12 to about 20 carbon atoms per molecule and said acid has from about 10 to about 20 carbon atoms per molecule and the concentration of said amine salt is between about 2 and about 4 percent by weight.